June 12, 1923.
L. S. LORD
FAUCET
Filed Nov. 24, 1919
1,458,718
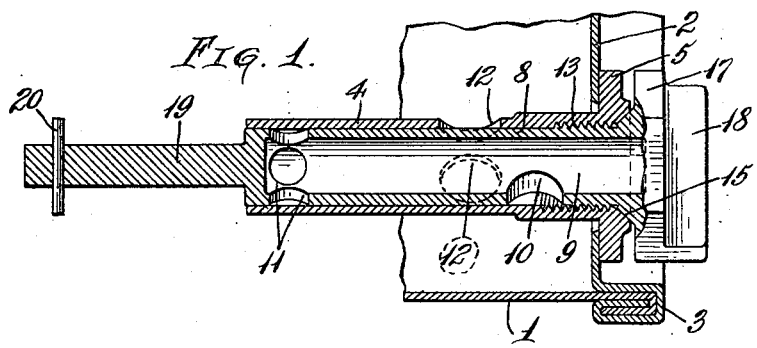
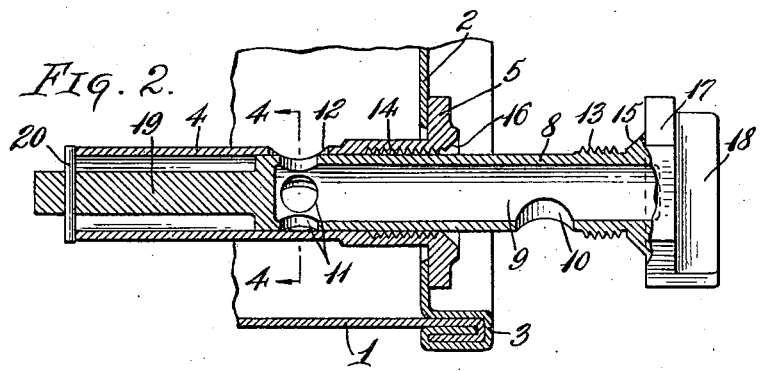
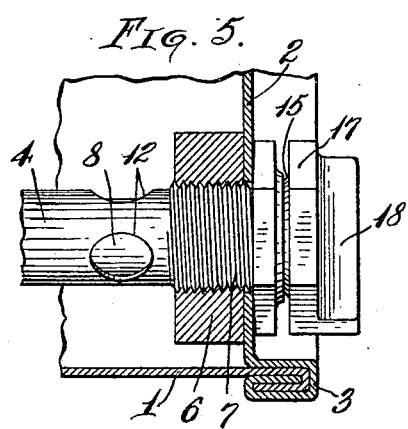
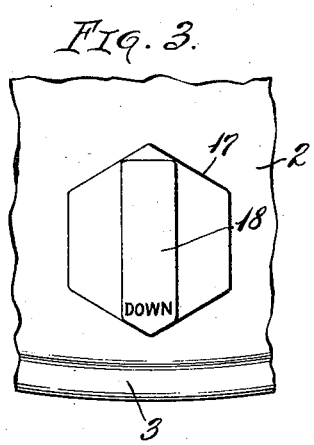
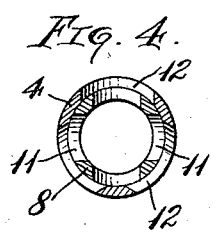
Inventor.
Lawrence S. Lord
By Brockett & Hyde
Attys.

Patented June 12, 1923.

1,458,718

UNITED STATES PATENT OFFICE.

LAWRENCE S. LORD, OF LAKEWOOD, OHIO.

FAUCET.

Application filed November 24, 1919. Serial No. 340,120.

*To all whom it may concern:*

Be it known that I, LAWRENCE S. LORD, a citizen of the United States, residing at Lakewood, in the county of Cuyahoga and State of Ohio, have invented certain new and useful Improvements in Faucets, of which the following is a specification.

This invention relates to faucets for use in withdrawing liquids from containers, such as barrels, drums, or casks.

The object of the invention is to provide an improved faucet capable of application to the end head of the container and so arranged as to enable the material to be discharged beyond the edge of the chime when the container is supported in horizontal position. A further object of the invention is to provide a faucet of this kind which is of simple construction and can be manufactured at relatively low cost and by simple operations; which requires no gaskets or sealing members but nevertheless is so arranged as to prevent leakage when the faucet is closed; and which faucet is provided with indicating means to assist in properly directing the stream delivered from the container.

Further objects of the invention are in part obvious and in part will appear more in detail hereinafter.

The invention comprises the construction and arrangement of parts hereinafter described and claimed.

In the drawings, Fig. 1 represents a longitudinal sectional elevation illustrating a portion of the container and a faucet applied thereto, the faucet being shown in closed position; Fig. 2 is a similar view illustrating the faucet open; Fig. 3 is an end view from the right in Fig. 2; Fig. 4 is a cross section on the line 4—4, Fig. 2; and Fig. 5 is a view partly in section and partly in elevation, illustrating a modification.

The faucet may be applied to any suitable form of container, the drawings showing for this purpose a portion of a metal drum or cask provided with a cylindrical side wall 1 and an end cap or head 2, said parts being secured together in any suitable manner, such as by folding the metal together to form a chime 3.

The faucet comprises an outer cylindrical shell member or sleeve 4 open at both ends and at its outer end suitably formed for connection to the container. For example, said sleeve may be provided at its outer end with an annular flange 5 the inner surface of which is welded or otherwise secured directly to the end cap 2, as shown in Fig. 1, or, if desired, the end cap or head may have a threaded fitting 6 welded or otherwise secured thereto, as shown in Fig. 5, and the outer portion of the sleeve 4 may be provided with threads 7 screwed into said fitting. Either construction or any similar construction is suitable for the purpose. The construction shown in Fig. 1 is used when the manufacturer permanently secures the faucet to the drum, whereas the construction shown in Fig. 5 enables the faucet to be attached to a drum already constructed.

Within the sleeve 4 is a plug member 8 of cylindrical form arranged to closely fit the inner surface of the wall of member 4 and slidable and rotatable therein. This member is cored out or otherwise formed to provide an inner longitudinal chamber 9. Near the outer end of said chamber is a discharge opening 10 while at or near its inner end are located a series (four being shown) of openings 11 designed to co-operate with a series (three being shown) of openings 12 in the wall of member 4. The number of openings 11 differs from the number of openings 12 so that when the faucet is open, as shown in Fig. 2, in which position the two sets of openings are in the same transverse plane, communication will be established from the space within the container to the chamber 9 no matter what may be the relative angular position of members 4 and 8 as a consequence of rotation of the member 8. The outer end of member 8 is provided with external threads 13 screwed into internal threads 14 of the sleeve 4 when the valve is closed, and to avoid use of gaskets or other sealing means member 8 is preferably provided outwardly beyond the theads 13 with a tapered or conical sealing member 15 adapted to co-operate with a similarly shaped seat 16 in member 4.

To operate the faucet member 8 is provided on its extreme outer end with a suitable head 17 which is preferably a fairly large solid member not likely to be broken in handling the container and which is preferably provided with a transversely extending pointer or indicator 18 best shown in Fig. 3 and which points downwardly when the opening 10 is at the bottom of member 8.

The inner end of member 8 is provided with an extended stem 19 whose purpose is to prevent complete withdrawal of the movable faucet member or plug from the container. This result is secured in the present construction by providing said stem 19 with a suitable cross pin or projection 20.

Fig. 1 shows the closed position of the faucet. Member 8 has been pushed in to engage the threads 13, 14 and has been screwed in until the member 15 closely engages the seat 16 and seals the faucet closed. A blank portion of the wall of member 8 lies opposite the openings 12 and the openings 11 lie opposite a blank portion of member 4. This arrangement together with the fairly close fit between members 4 and 8 vary materially retards any possible flow of fluid to the chamber 9 and to the threads 13, 14 even should the valve leak or not have been tightly closed.

To open the faucet the inner member is turned by application of the fingers or a wrench to the member 17 until the threads 13, 14 are wholly disengaged. Member 17 is then turned until the indicator 18 points downwardly to indicate that the opening 10 is underneath. The member 8 is then pulled outwardly to the position shown in Fig. 2, whereupon the fluid will flow from the drum space through the openings 10 to the receptacle. When the receptacle is full the member 8 is merely pushed inwardly which entirely cuts off the stream so that overflow is not likely to occur. The parts are then screwed together to restore them to the position shown in Fig. 1.

What I claim is:

1. A faucet for liquid containers, comprising a cylindrical shell adapted for connection to a container, said shell having a series of circumferentially spaced openings in its wall, a plug in said shell provided with an axial chamber having a discharge opening at one end and a series of circumferentially spaced openings near its other end, a sealing member on said plug, and a co-operating seat on said shell, the openings in said shell having a greater aggregate discharge capacity than the openings in said plug.

2. A faucet for liquid containers, comprising a cylindrical shell adapted for connection to a container, said shell having a series of circumferentially spaced openings in its wall, a plug in said shell provided with an axial chamber having a discharge opening at one end and a series of circumferentially spaced openings near its other end, a sealing member on said plug, and a co-operating seat on said shell, the number of spaced openings in said shell differing from the number of spaced openings in said plug and having a greater aggregate discharge capacity than the openings in said plug.

3. A faucet for liquid containers, comprising a cylindrical shell adapted for connection to a container, said shell having a series of circumferentially spaced openings in its wall, a plug in said shell provided with an axial chamber having a discharge opening at one end and a series of circumferentially spaced openings near its other end, a sealing member on said plug, and a co-operating seat on said shell, the number of spaced openings in said shell being less than the number of spaced openings in said plug and having a greater aggregate discharge capacity than the openings in said plug.

In testimony whereof I affix my signature.

LAWRENCE S. LORD.